United States Patent

Schlatter

[15] 3,642,491

[45] *Feb. 15, 1972

[54] ARTIFICIALLY SWEETENED CONSUMABLE PRODUCTS

[72] Inventor: James M. Schlatter, Glenview, Ill.

[73] Assignee: G. D. Searle & Co., Chicago, Ill.

[ * ] Notice: The portion of the term of this patent subsequent to Jan. 27, 1987, has been disclaimed.

[22] Filed: Jan. 12, 1970

[21] Appl. No.: 2,393

Related U.S. Application Data

[63] Continuation-in-part of Ser. No. 543,054, Apr. 18, 1966, Pat. No. 3,492,131, and a continuation-in-part of 841,582, July 14, 1969.

[52] U.S. Cl. ........................................99/28, 99/78, 99/100, 99/130, 260/112.5, 99/141 A, 99/139, 99/142

[51] Int. Cl. ..............................................A23l 1/26

[58] Field of Search..........................99/141, 28, 100, 78, 130

[56] References Cited

UNITED STATES PATENTS 3,492,131   1/1970   Schlatter..................................99/141
3,510,310   5/1970   Breckwoldt................................99/28

*Primary Examiner*—Raymond N. Jones
*Attorney*—John M. Brown, John J. Kolano, Elliot N. Schubert, Walter C. Ramm and Helmuth A. Wegner

[57]   ABSTRACT

Artificially sweetened consumable products having low-caloric content and lacking in unpleasant aftertaste are obtained by incorporating a sweetening agent of the class consisting of the lower alkyl esters of aspartylphenylalanine and aspartylhexahydrophenylalanine.

10 Claims, No Drawings

ARTIFICIALLY SWEETENED CONSUMABLE PRODUCTS

This application is a continuation-in-part of my copending applications, Ser. Nos. 543,054 (now U.S. Pat. No. 3,492,131) and 841,582, filed Apr. 18, 1966 and July 14, 1969, respectively.

The present invention relates to artificially sweetened consumable products which contain as the sweetening agent a lower alkyl ester of aspartylphenylalanine or aspartylhexahydrophenylaline as represented by the following structural formula

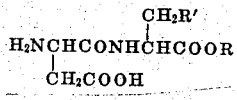

$$H_2NCHCONHCHCOOR$$

with side chains $CH_2R'$ and $CH_2COOH$ wherein R is a lower alkyl radical and R' is a phenyl or cyclohexyl radical.

The lower alkyl radicals encompassed by that formula are typified by methyl, ethyl, propyl, butyl, pentyl, hexyl, heptyl and the branched-chain isomers thereof.

The use of low caloric nonnutritive sweetening agents to replace sucrose is of great importance to diabetic and diet-conscious individuals. This need has stimulated the search for artificial sweetening agents which may be used as sugar substitutes. The first artificial sweetener approved for general use was saccharin. This substance is remarkably sweeter than sucrose, having a potency of 250–350 times the latter material, but it suffers from the serious disadvantage of possessing a bitter aftertaste. More recently, the sweetening property of cyclohexylsulfamic acid (cyclamate) and its sodium and calcium salts was discovered. Those substances are about 30 times as sweet as sucrose, but likewise suffer from serious disadvantages.

The sweetening agents incorporated in the consumable products of this invention are markedly sweeter than sucrose, possessing a potency of 50–250 times relative to that standard. They are, moreover, lacking in the unpleasant aftertaste characteristic of currently available artificial sweeteners. In addition, their derivation from naturally occurring amino acids indicates a lack of toxic properties. These agents are manufactured by the methods disclosed in my aforementioned copending applications, Ser. Nos. 543,054 and 841,582.

The aforementioned dipeptide sweetening agents wherein R is methyl, i.e., the methyl esters, and the stereoisomers of L—L configuration are particularly preferred for incorporation into the instant consumable materials. L-aspartyl-L-phenylalanine methyl ester and L-aspartyl-L-hexahydrophenylalanine methyl ester thus display a potency of about 200–250 times that of sucrose. The corresponding ethyl esters are about half as sweet.

The sweetening agents incorporated into the instant consumable materials are stable water-soluble substances. A sweetened carbonated orange soda, for example, was observed to have retained its sweetness after standing for an extended period of time.

Depending upon the particular consumable material to be sweetened the dipeptide sweetening agents can be incorporated in a variety of physical forms. Suitable solid forms are powders, tablets, granules and dragees, and suitably liquid forms are exemplified by solutions, suspensions, syrups and emulsions as well as other commonly employed forms particularly suited for combination with consumable materials. In addition, combinations with suitable nontoxic sweetening agent carriers such as water, ethanol, sorbitol, glycerol, citric acid, corn oil, peanut oil, soybean oil, sesame oil, propylene glycol, corn syrup, maple syrup, liquid paraffin, lactose, cellulose, starch, dextrin and other modified starches, calcium phosphate and di- and tri-calcium phosphate are also suitable.

Combinations of the dipeptide sweetening agents with sugar or synthetic sweeteners such as saccharin likewise can be incorporated into the consumable materials of this invention. Lesser amounts of each sweetener are, furthermore, required as a result of the synergism effected by such combination.

Specific examples of consumable materials containing the aforementioned dipeptide sweetening agents are fruits, vegetables, juices, meat products such as ham, bacon and sausage, egg products, fruit concentrates, gelatins, jams, jellies, preserves, milk products such as ice cream, sour cream and sherbet, ices, syrups such as molasses, corn, wheat, soybean and rice products such as bread, cereal, pasta and cake mixes, fish, cheese and cheese products, nut meats and nut products, beverages such as coffee, tea, noncarbonated and carbonated soft drinks, beers, wines and other liquors, confections such as candy and fruit-flavored drops, condiments such as herbs, spices and seasonings, flavor enhancers such as monosodium glutamate, chewing gum, instant mixes, puddings and coffee whiteners. Consumable toiletries such as mouthwashes and toothpaste as well as proprietary and non-proprietary pharmaceutical preparations are also contemplated.

In the following examples there are given specific formulas illustrative of the present invention. These formulas are not to be construed as restrictive of the invention, however, as it will be obvious to those skilled in the art that minor variations may be made without departing from the scope of the invention as defined by the claims.

EXAMPLE 1

Carbonated Orange Soda

A stock supply of bottler's syrup is prepared by mixing 5.5 ml. of a 60 percent aqueous citric acid solution with 150 ml. of water, dissolving 2 g. of L-aspartyl-L-phenylalanine methyl ester in that solution, adding successively 7.02 ml. of the orange flavor base manufactured by the A. E. Illes Company, Dallas, Texas, labeled FO–78, and 2.7 g. of sodium benzoate, then diluting that mixture to 200 ml. with water. One oz. samples of that bottler's syrup are transferred to 6 oz. bottles and 110 ml. of cold tap water is added to each bottle. To each bottle 42 ml. of cold charged bottling water (5 volumes carbon dioxide) is then added to achieve carbonation. Each bottle is capped and the contents mixed.

EXAMPLE 2

Gelatin Dessert

A sample is prepared from 2.07 g. of plain gelatin, 0.34 g. of imitation raspberry flavoring, 0.34 g. of citric acid, 14.41 g. of lactose and 0.05 g. of L-aspartyl-L-phenylalanine methyl ester. The ingredients are combined and dissolved in 82.79 ml. of boiling spring water. Thereafter the solution is poured into dishes and chilled to set.

EXAMPLE 3

Carbonated Cola Beverage

To a solution of 16.85 g. of L-aspartyl-L-phenylalanine methyl ester in 3,000 ml. of water is added one-quarter oz. of 85 percent phosphoric acid, 10 g. of sodium benzoate, 2 oz. of cola flavor concentrate and sufficient water to make 1 gallon of bottler's syrup. A 2 oz. throw of bottler's syrup is used per 10 oz. bottle, which is then filled with carbonated water to give 3.4 volumes of carbon dioxide.

EXAMPLE 4

Heat-treated Peach Pack

The fresh peaches, after washing, removal of the pits and slicing into pieces of desired size (fruit content equals 40–80 percent by weight of the resulting puree), are added to a syrup prepared from 0.834 g. of L-aspartyl-L-phenylalanine methyl ester per 10 oz. can of puree. The mixture is then acidified by the addition of citric acid such that the ratio between the acid and the sweetness content is 1:30. The prepared puree is then packed cold in 10 oz. cans. Prior to sealing the container, the product undergoes a steam exhaustion for 5 minutes. After sealing, the cans are treated for 15 minutes at 100° C.

EXAMPLE 5

Milk Pudding

Add 1.14 ozs. of the following formula to 2 cups of cold skimmed milk in a bowl. Stir slowly with an egg beater to disperse the powder, then mix rapidly until a smooth texture is obtained. Allow to set.

Alginate - 6 lbs.
Cocoa - 30 lbs.
Tetrasodium pyrophosphate, anhydrous - 3 lbs.
Salt - 1 lb., 8 ozs.
L-aspartyl-L-hexahydrophenylalanine methyl ester - 1 lb., 2 ozs.
Vanillin - 4.8 ozs.

EXAMPLE 6

Preserves (100 lb. batch)
Fruit - 55 lbs.
L-aspartyl-L-hexahydrophenylalanine methyl ester - 1½ ozs.
Pectin (low methoxyl) - 1 lb.
Potassium sorbate - 1 oz.
Water - 5 gal., 1 pint

EXAMPLE 7

Dietetic Syrup
L-aspartyl-L-hexahydrophenylalanine methyl ester - 0.30 percent
Carboxymethylcellulose - 0.50 percent
Pectin - 1.60 percent
Flavor - 8.50 percent
Citric acid, anhydrous - 2.00 percent
Color - 0.30 percent
Sodium benzoate - 0.10 percent
Water - 86.70 percent

EXAMPLE 8

Powdered Beverage Concentrate
A powder is prepared by mixing the following ingredients:
Citric acid - 0.05 g.
Imitation strawberry flavoring - 0.04 g.
L-aspartyl-L-hexahydrophenylalanine methyl ester - 0.09 g.
Lactose - 0.609 g.
That powder is dissolved in 100 ml. of spring water for use.

What is claimed is:

1. A sweetened consumable material comprising the consumable material and a sweetening agent represented by the following formula

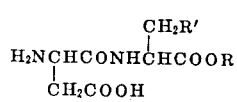

wherein R is a lower alkyl radical, R' is a phenyl radical and the stereochemical configuration is L—L, DL—DL, L–DL or DL–L, in the amount which will afford the degree of sweetness desired.

2. As in claim 1, a sweetened consumable material comprising the consumable material and L-aspartyl-L-phenylalanine methyl ester in the amount which will afford the degree of sweetness desired.

3. As in claim 1, a sweetened dietetic beverage comprising the beverage and a sweetening agent represented by the following formula

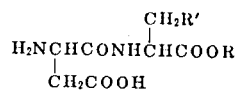

wherein R is a lower alkyl radical, R' is a phenyl radical and the stereochemical configuration is L—L, DL—DL, L–DL, or DL–L, in the amount which will afford the degree of sweetness desired.

4. As in claim 1, a sweetened dietetic beverage comprising the beverage and L-aspartyl-L-phenylalanine methyl ester in the amount which will afford the degree of sweetness desired.

5. As in claim 1, a sweetened fresh fruit pack comprising the fresh fruit pack and a sweetening agent represented by the following formula

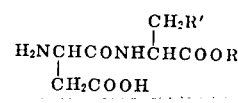

wherein R is a lower alkyl radical, R' is a phenyl radical and the stereochemical configuration is L—L, DL—DL, L–DL, or DL–L, in the amount which will afford the degree of sweetness desired.

6. As in claim 1, a sweetened fresh fruit pack comprising the fresh fruit pack and L-aspartyl-L-phenylalanine methyl ester in the amount which will afford the degree of sweetness desired.

7. As in claim 1, a sweetened gelatin dessert comprising the gelatin dessert and a sweetening agent represented by the following formula

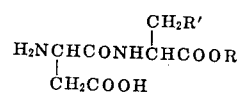

wherein R is a lower alkyl radical, R' is a phenyl radical and the stereochemical configuration is L—L, DL—DL, L–DL or DL–L, in the amount which will afford the degree of sweetness desired.

8. As in claim 1, a sweetened gelatin dessert comprising the gelatin dessert and L-aspartyl-L-phenylalanine methyl ester in the amount which will afford the degree of sweetness desired.

9. As in claim 1, a sweetened powdered beverage concentrate comprising the powdered beverage concentrate and a sweetening agent represented by the following formula

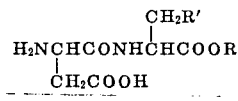

wherein R is a lower alkyl radical, R' is a phenyl radical and the stereochemical configuration is L—L, DL—DL, L–DL or DL–L, in the amount which will afford the degree of sweetness desired.

10. As in claim 1, a sweetened powdered beverage concentrate comprising the powdered beverage concentrate and L-aspartyl-L-phenylalanine methyl ester in the amount which will afford the degree of sweetness desired.

* * * * *